Patented May 21, 1929.

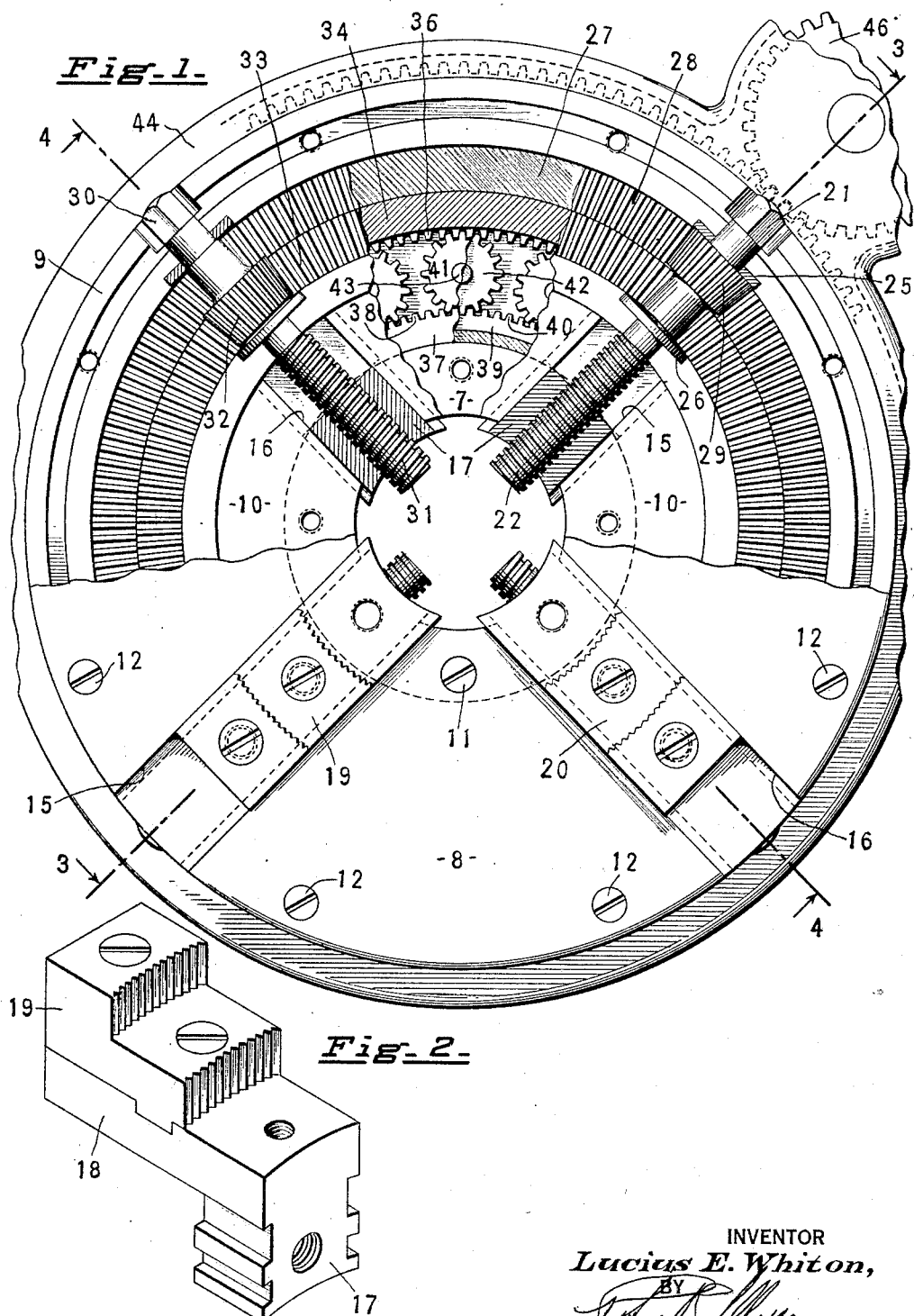

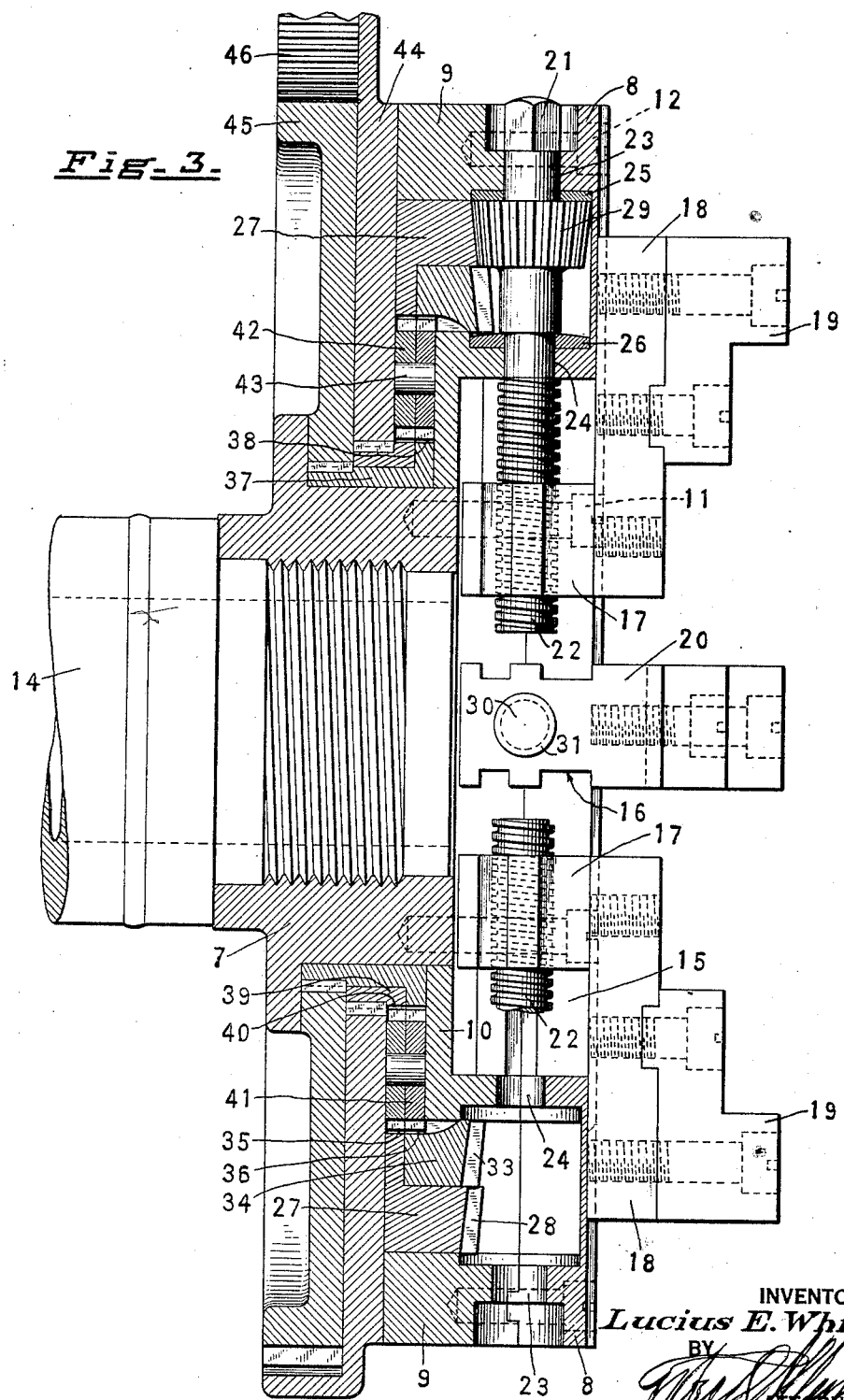

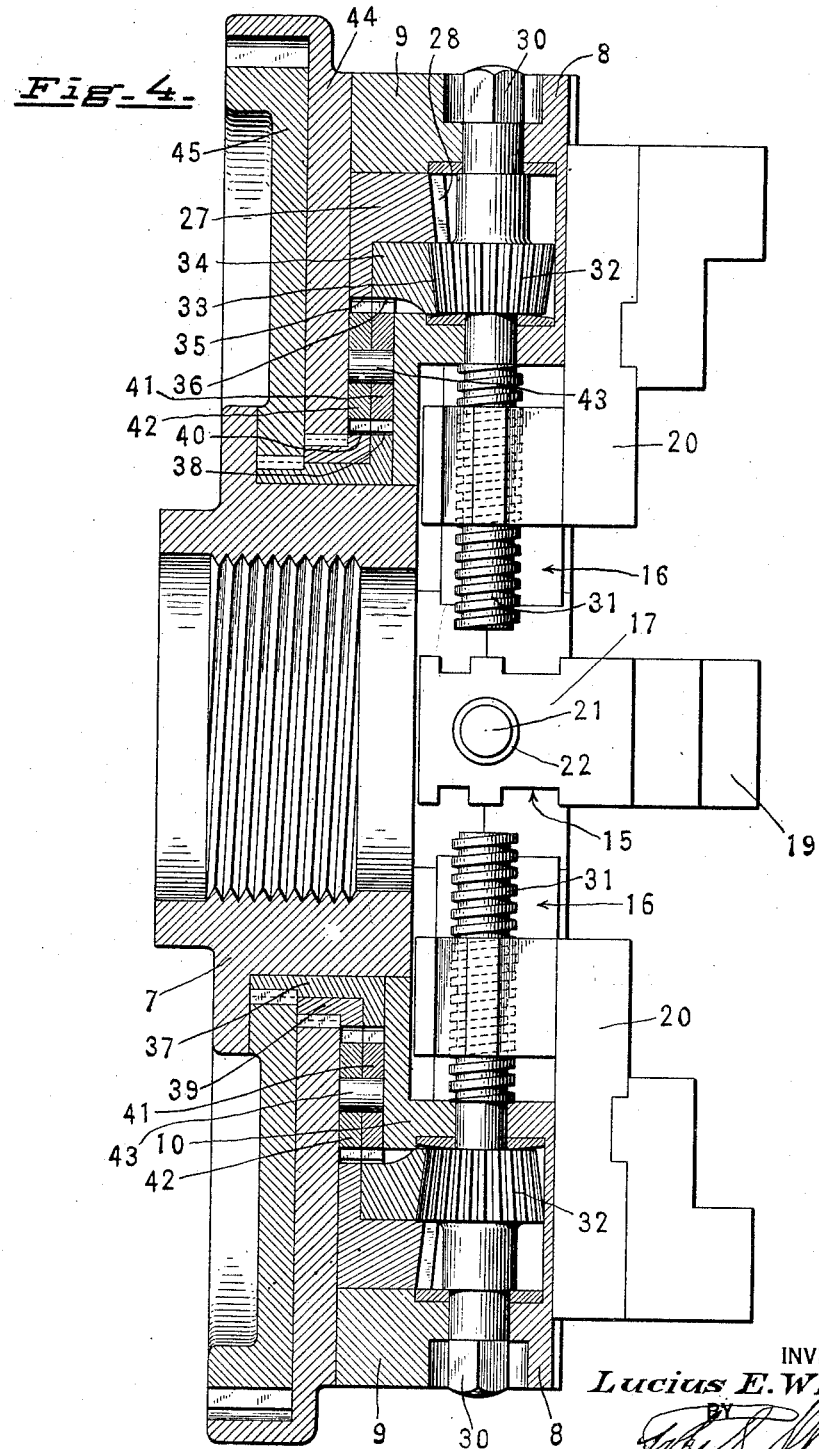

1,713,803

UNITED STATES PATENT OFFICE.

LUCIUS E. WHITON, OF NEW LONDON, CONNECTICUT.

LATHE CHUCK.

Application filed November 15, 1926. Serial No. 148,466.

One object of my invention is to provide a chuck for holding irregularly shaped stock and permitting adjustment while the chuck is rotating.

Another object is to provide such a chuck in which the jaws can be adjusted with substantially equal pressure while the chuck is rotating or stationary.

Another object is to provide a construction of this character which is compact and reliable and will permit the stock or tools to be fed through the chuck.

Another object is to provide a construction of this character in which the pairs of jaws can be adjusted independently or together.

In carrying out the invention, I employ two pairs of jaws which are adapted to be adjusted by means of radial screws which in turn are rotated by means of bevel gears. Within the chuck is a planetary gear mechanism by means of which the radial screws may be rotated while the chuck is rotating. These gear trains are preferably so designed as to substantially equalize the presssure applied to the various pairs of jaws.

Fig. 1 is an end view of a chuck embodying my invention, parts being broken away and others parts being shown in section.

Fig. 2 is a perspective view of one of the jaws.

Fig. 3 is a longitudinal sectional view of the chuck on the plane of the line 3—3 in Fig. 1, some of the parts being omitted to show the interior construction.

Fig. 4 is a similar sectional view on the plane of the line 4—4 of Fig. 1.

The body of the chuck in the form shown consists of a hub 7, a face plate 8, an outer ring or rim 9, and a cup piece or bearing ring 10. The face plate is secured to the hub by means of screws 11, and to the rim by means of screws 12. The hub member serves as a means for supporting the chuck on the lathe spindle 14. Preferably, the construction is so arranged that the stock to be treated or tools for operating on the stock may be fed thru a hollow spindle.

The chuck body is provided with two pairs of radial slots or guideways such as 15 and 16 for the jaws. Each jaw is provided with an interiorally threaded portion such as 17, which is guided in one of the slots in the chuck and 17 is provided with a base portion 18, which supports the gripping portion 19, of the jaw. These gripping portions may be of any suitable design and secured in place in any suitable manner as is common in chuck practice.

The jaws 20, are constructed in a manner similar to jaws 17. Each jaw 17 is provided with a radially extending adjustor such as 21. This adjustor has a screw thread 22, which engages in the nut portion of the jaw 17.

Each adjustor is rotatably supported in the chuck—preferably in bearings such as 23 and 24, which are formed respectively between the face plate 8 and the rings 9 and 10. Each adjustor is also provided with thrust pieces such as 25 and 26. These adjustors are adapted to be rotated by means of an ordinary socket wrench in the manner common in chuck practice.

The outer gear ring 27 is mounted within the rim 9 of the chuck and provided with bevel gear teeth 28, which mesh with the teeth of a bevel pinion 29 on the adjustor 21. The gear ring 27 has a geared connection with the pinions 29 on the oppositely disposed adjustors 21. The adjustors 30 are provided with screw threads 31, which fit in the nut portions of the jaws 20.

The bevel pinions 32 both mesh with the teeth 33 on the inner gear ring 34, which is mounted within the gear ring 27.

The gear rings 27 and 34 are provided with annular gear teeth 35 and 36 respectively, which face towards the axis of the chuck.

A sleeve 37 mounted on the hub 7 has a spur gear with teeth 38 extending outwardly opposite the gear teeth 36. Another sleeve 39, mounted on the sleeve 37, has a gear with teeth 40 extending outwardly opposite the gear teeth 35. Between the gear teeth 36 and 38 are mounted a plurality of planetary pinions 41 and between the gear teeth 35 and 40 are mounted companion pinions 42. These pinions 41 and 42 are arranged in pairs on the stud shafts 43 so that the two pinions of a pair may rotate independently of each other on their respective shafts, but each pair is compelled to travel as a unit with its shaft around the axis of the chuck and between the inner and outer gears.

The relative movement of the sleeves 37 and 39 is controlled by the disks or plates 44 and 45, which are so constructed and mounted as to permit of movement of one with respect to the other. For instance, the plate 44 may be stationary and the plate 45 adapted to be rotated with respect to it, for example, by means of a hand or power driven pinion 46. The pairs of planetary pinions 41, 42, etc., are mounted between oppositely disposed bearing faces of the ring 10 and disk 44. It will be understood, of course, that the bearing parts may be lubricated in any suitable manner.

In operation, the two disk members 44 and 45 would be both stationary so that they in turn hold the sleeves 39 and 37 stationary, together with their spur gears 38 and 40.

The rotation of the chuck body carries with it, of course, the face plate, the outer ring and inner ring and the gear members 27 and 34. This causes the planetary pinions to travel around idly between the inner and outer gears.

If one of the disks 44 or 45 is rotated with respect to the other, it is obvious that the gear member 40 or 39 will move with it so as to cause the spur gears 38 and 40 to move with respect to each other and in turn cause the pinions 41 and 42 to rotate with respect to each other on the shafts 42. This, in turn, causes a relative rotation of the gear rings 27 and 34 so as to rotate the adjustor whose bevel pinion is geared to it. When the jaws connected to one pair of adjustors are tightly gripped against the stock, further rotation of those adjustors is, of course, impossible. As a result of this stopping of the rotation of one pair of adjustors the torque is transmitted to the other pair of adjustors thru their bevel gear and ring; thus, in effect, substantially equalizing the pressure of the two sets of jaws. This makes it possible to automatically grip pieces having an irregular cross section such as a rectangular or oval piece. To accomplish this equalizing action with substantial exactness, it is desirable to have proper gear ratios between the various gears.

As an example, for one particular chuck, the spur gears 38 and 40 may have sixty teeth each, the planetary pinions 41 and 42, ten teeth each, and the annular gears 35 and 36, eighty teeth each. Each of the bevel pinions 29 and 32 may have ten teeth and the bevel gears 28 and 33 may have one hundred and four and ninety-one teeth respectively. To obtain the equalizing pressure the screws 22 and 31 should be oppositely directed and of different pitch; for instance, in the particular combination shown, the screws 22 on the adjustors 21, which are driven by the outer gear member 27, may have six left hand threads per inch, and the screws 31 on the adjustors 30, which are driven by the inner gear ring 34, may have five and one-quarter right hand threads per inch. This arrangement provides a substantially equal radial jaw travel for each pair of jaws a complete revolution of the respective bevel gears which operate the pairs of screws.

It should be understood, of course, that other sizes and proportions may be used within the scope of my invention.

I claim:

1. A chuck comprising a body, two pairs of jaws guided therein, radial adjustors having screw threaded portions engaging said jaws, the threads on one pair of adjustors being right handed and those on the other pair being left handed, and trains of gears for driving said adjustors and equalizing the pressure on both pairs of jaws, said trains of gears comprising differentially rotatable spur gears, gear rings geared to said radial adjustors for driving the same and planetary pinions geared to rotate between said spur gears and said rings.

2. A chuck comprising a hub, two spur gears mounted concentrically thereof and side by side, abutment plates on opposite sides thereof, gear rings surrounding said gears, each of said rings having teeth facing said spur gears and also bevel teeth, one set of bevel teeth being rotatable about the others, a pair of planetary pinions arranged between said abutment plates to travel between said spur gears and said rings, radial adjustors geared to said gear rings, a rim surrounding said gear rings, a face plate secured to said hub and rim, jaws movable by said adjustors and means for rotating one of said spur gears with respect to the other.

3. A chuck comprising a body consisting of a hub, a rim, a face plate secured to said hub and rim, a bearing ring within the rim, jaws guided in said face plate, radial adjustor screws connected to said jaws and supported in said bearing ring, a stationary plate, gear rings mounted between said plate and said adjustor screws and geared thereto, planetary pinions movable between said plate and said bearing ring and geared to said gear rings and inner gears meshing with said pinions.

4. In a chuck, a body, two pairs of jaws movable therein, a radial adjustor for each jaw, two gear rings geared respectively to the jaws of the two pairs, said gear rings having annular gears, two spur gears arranged inside of said annular gears, pairs of planetary pinions rotatable between the inner and outer gears and means for rotating one of the inner gears with respect to the other.

5. A chuck comprising a body having radial guide ways, jaws movable in said guide ways, a radial screw adjustor for each jaw, a bevel pinion on each adjustor, two gear rings rotatable in said body, one of said rings being geared to at least one bevel pinion and the other ring being geared to at least one other pinion, and means for rotating one gear ring with respect to the other gear ring while the chuck is rotating, said means comprising two spur gears and planetary pinions geared to travel between said spur gears and said gear rings.

6. A chuck as set forth in claim 5 in which the screw thread on one adjustor has a direction of helix opposite to that of another adjustor.

7. A chuck comprising a body, two radial adjustors having screw threads mounted to rotate in the body and having oppositely directed threads, a bearing ring for said adjustors, two abutment members, means for rotating one abutment with respect to the other, two spur gears connected respectively to said abutment members, two annular gears geared respectively to said adjustors, and a pair of pinions on a common shaft mounted for planetary movement between the spur and annular gears and guided between said bearing ring and one abutment member.

8. A chuck comprising a body having a series of radial guideways, pairs of jaws arranged in the respective guideways, a radially arranged adjusting member for each jaw, each adjusting member having a screw thread coacting with its jaw, the threads on the members of one pair being pitched in the direction opposite to that of the threads on another pair, gear rings having toothed driving connections with the respective pairs of radial jaw adjusting members, each gear ring also having inwardly projecting teeth constituting annular gears, spur gears arranged coaxially with said gear rings and rotatable with respect to each other and pairs of planetary pinions geared to rotate between said spur gears and said annular gears, and means for rotating one spur gear with respect to the other spur gear while the chuck body is rotating, whereby the jaws of each pair of jaws may be moved together and the jaws of the two pairs may be moved independently or together depending upon the resistance offered to movement of one pair and while the chuck body is rotating.

9. In a chuck, a body having radially movable jaws, two gear rings each having inwardly projecting gear teeth and each also having a bevel gear, said bevel gears being geared respectively to one of said jaws to move them radially, two normally stationary spur gears, means for rotating said spur gears relative to each other, and a pair of planetary pinions mounted to travel in the space between said spur gears and said gear rings.

10. In a chuck, a body having two pairs of radially movable jaws, two gear rings geared respectively to said pairs of jaws and each ring having inwardly projecting teeth, two relatively rotatable spur gears and pairs of planetary pinions travelling between said spur gears and said gear rings.

11. A chuck comprising a body having a hub and a face plate, an annular rim detachably connected to the outer edge of the face plate, an interior cover plate, a series of jaws adjustably mounted in said face plate, a radially arranged adjusting spindle geared to each jaw and supported between the face plate on the one side and the rim and cover plate on the other side, two gear rings having bevelled gear teeth for driving the respective spindles, spur gears supported on said hub, planetary pinions geared to travel between said spur gears and said gear rings, a plate connected to one of the spur gears and forming a lateral abutment for some of the pinions, said cover plate forming a lateral abutment for the other pinions, and means for rotating the other spur gear.

LUCIUS E. WHITON.